(12) United States Patent  
Lees

(10) Patent No.: US 7,914,286 B2
(45) Date of Patent: Mar. 29, 2011

(54) TEACHING GAME METHOD FOR SIMULATING MANAGEMENT OF A BUSINESS OPERATION

(76) Inventor: Herbert John Newton Lees, Winchester, MA (US)

(*) Notice: Subject to any disclaimer, the term of this patent is extended or adjusted under 35 U.S.C. 154(b) by 158 days.

(21) Appl. No.: 12/489,022

(22) Filed: Jun. 22, 2009

(65) Prior Publication Data

US 2009/0325132 A1    Dec. 31, 2009

(51) Int. Cl.
*G09B 19/18* (2006.01)
(52) U.S. Cl. ........................ 434/107
(58) Field of Classification Search .............. 434/107, 434/128, 129, 236; 273/256
See application file for complete search history.

(56) References Cited

U.S. PATENT DOCUMENTS

| | | | | |
|---|---|---|---|---|
| 2,230,699 | A * | 2/1941 | Schulze | 273/148 R |
| 4,386,778 | A * | 6/1983 | Hall | 273/256 |
| 4,501,425 | A * | 2/1985 | Alvarado | 273/256 |
| 4,522,407 | A * | 6/1985 | Hatherley | 273/256 |
| 4,538,816 | A * | 9/1985 | Figueroa | 273/256 |
| 4,840,382 | A * | 6/1989 | Rubin | 463/9 |
| 5,056,792 | A | 10/1991 | Helweg-Larsen et al. | |
| 5,071,135 | A * | 12/1991 | Campbell | 273/256 |
| 5,139,269 | A * | 8/1992 | Peterson | 273/256 |
| 5,737,581 | A | 4/1998 | Keane | |
| 5,829,747 | A * | 11/1998 | Nebel | 273/256 |
| 6,106,300 | A * | 8/2000 | Kiyosaki et al. | 434/107 |
| 6,375,466 | B1 * | 4/2002 | Juranovic | 434/107 |
| 6,408,263 | B1 | 6/2002 | Summers | |
| 2002/0138242 | A1 | 9/2002 | Wilensky et al. | |

FOREIGN PATENT DOCUMENTS

| | | |
|---|---|---|
| EP | 0382369 B1 | 10/1996 |
| EP | 1092213 B1 | 9/2003 |

* cited by examiner

*Primary Examiner* — Kurt Fernstrom
(74) *Attorney, Agent, or Firm* — Dickinson Wright PLLC

(57) ABSTRACT

A game that teaches principles of dynamic business management by advancing tokens (20) along a work flow path (22) on a playing surface (24) to simulate multiple processes of a fictitious business enterprise over time. The work flow path (22) includes at least three distinct and progressive processing areas (30, 32, 34, 36), each representing a different value-added function of the fictitious business. A constraint zone (38) having a specified token (20) capacity is established in each processing area (30, 32, 34, 36), and all tokens (20) must pass through each constraint zone (38) during the play of the game. The token (20) capacity of at least one of the constraint zones (38) may be changed by the players by adding or subtracting work capacity squares (50, 52) during a round to provoke variations in the rate of token (20) advance along the work flow path (22) to thereby simulate a management decision on a dynamic system over time so that its effects can be observed.

20 Claims, 9 Drawing Sheets

REVENUE
Paid Jobs                    × $5,000 = [ $     ]
                               Accounting Output PRODUCTION COSTS
Completed Jobs               × $5,000 = $
                               Production Output GROSS MARGIN                           [ $     ]
Marketing Cost                           $60,000
                               "Fixed Cost"
                               $60,000 for 230 Leads=$260/Lead Sales                        × $500 = $
                               Sold Jobs = Sales Output Production Overhead          × $100 = $
                               Production Squares/Staff Accounting Cost              × $50 = $
                               Accounting Squares/Staff

TOTAL EXPENSES                         [ $     ]

PROFIT                                 [ $     ]

FIG. 6

CASH/BANK

Fees from Loans    # Loans, Legal/Closing Input ×    Average fees per loan    $_____

Less

Lead Generation costs    # Lead Generation Work squares ×    Cost per Lead Generation work square    $_____

Loan Origination costs    # Loan Origination Work squares ×    Cost per Loan Origination work square    $_____

Legal/Closing costs    # Loans, Legal/Closing output ×    Legal costs per closed loan    $_____

Accounting costs    # Accounting Work squares ×    Cost per Accounting work square    $_____

Net Cash/Bank      = $_____ +

LOAN ASSETS

Loans Created    # Loans, Legal/Closing Output ×    Average Loan Face Value    $_____

LIABILITIES

CDO/Bundled Loans    # Loans, Legal/Closing Output ×    Average Loan Face Value × Discount Factor    $_____

EQUITY

Net Assets – Liabilities      $_____

FIG. 7

VALUE CREATED

People hired     # Inducted Employees × Operating Profit/Employee     $_____

*Less*

Attrition        Yield Loss Career Mgmt × Operating Profit/Employee × 120% (exiting costs)     $_____

GROSS VALUE CREATED     $_____

*Less*

Search Costs     # Search Process Work Spaces × Search Process Cost per Work Square     $_____

Recruit & Hire Costs     # Recruited Staff (Output) × Recruit & Hire Process Cost per completed hiring     $_____

Induction        # Induction Work Spaces × Induction Cost per Work Square     $_____

Career Mngt Costs     # Career Management Work Spaces × Career Mngt Costs per Work Square     $_____

NET VALUE CREATED     $_____

TEACHING GAME METHOD FOR SIMULATING MANAGEMENT OF A BUSINESS OPERATION

CROSS REFERENCE TO RELATED APPLICATION

This application claims priority of U.S. Provisional Application No. 61/075,042, filed Jun. 24, 2008.

BACKGROUND OF THE INVENTION

1. Field of the Invention

A method for playing a game that teaches principles of dynamic business management.

2. Description of the Prior Art

Systems dynamics is an approach to understanding the behavior of complex systems over time. It deals with internal feedback loops and time delays that affect the behavior of the entire system. What makes using system dynamics different from other approaches to studying complex systems is the use of feedback loops and stocks and flows. These elements help describe how even seemingly simple systems display baffling nonlinearity.

Business enterprises tend to follow the behaviors of a complex system. Managers of businesses that fail to appreciate the concepts of systems dynamics are often ill-equipped to effectively address changes that occur over time. Various games have been developed to help educate people to become better business managers, some of which acknowledge the concept of systems dynamics and others that do not.

In the early 1960's, MIT's Sloan School of Management developed a business management flight simulator known as "The Beer Game", which has been played all over the world by thousands of people ranging from high school students to chief executive officers and government officials.

The Beer Game includes a plurality of tokens, each representing an imaginary case of beer which, in the context of that fictitious business model is technically considered a unit of economic activity. A work flow path is displayed for advancement of the tokens from a start end to a finish end during the play of the game. The work flow path includes a first processing area positioned at the start end of the work flow path and a last processing area positioned at the finish end of the work flow path and at least one intermediate processing area positioned along the work flow path between the first and last processing areas. The game is played over a plurality of rounds, and during each round tokens are added to the start end of the work flow path and tokens are removed from the finish end of the work flow path. During each round, tokens are also advanced along the work flow path from one processing area to another.

Players are positioned at each of the processing areas, and communication between the processing areas is forbidden, with the exception of placing an "order" to the next processing area upstream. The well-known and internationally recognized Beer Game demonstrates systems dynamics in an environment when players make independent decisions, the decision rules require them to fill orders received and place orders upstream without communicating to other players; collaboration is not permitted. The Beer Game demonstrates systems dynamics in a supply chain with these characteristics. It teaches a macro-economics view of supply chain management. The Beer Game does not, however, teach management principles on a micro-economics level. Because of its macro perspective, the Beer Game is incapable of demonstrating solutions to management of characteristics within a business, particularly where the key decisions are whether to increase or decrease capacity and whether to improve process efficiency within an organization.

SUMMARY OF THE INVENTION AND ADVANTAGES

The invention provides a teaching game wherein a constraint zone is established in each processing area. Each constraint zone has a specific token capacity, and all tokens must pass through each constraint zone while advancing toward the finish end of the work flow path. During the play of the game, the token capacity of at least one of the constraint zones is changed to provoke variations in the rate of token advance along the work flow path. By changing the token capacity of at least one constraint zone, it is possible to simulate a real-life management decision on a dynamic business process whose effects can be observed over time.

In contrast to The Beer Game, where communication is strictly forbidden between players at different processing areas, players of the subject game are encouraged to collaborate on the decisions each must make in order to maximize profitability or other common objectives of the fictitious organization. For example, players may collaborate on whether to add or subtract capacity within any one of several processing areas. Because the subject game is set in a fictitious environment that can be adapted to closely parallel almost any type of business operation in the real world, players engage in an interactive learning processes in which they appreciate how to collaboratively optimize capacity and efficiency components in a dynamic business setting. Thus, by playing the game of this invention, players learn why collaboration is important in the context of decision making, and that collaboration must be on specific issues.

In contrast further still, the processing areas of The Beer Game have an unlimited token capacity, whereas the subject invention simulates the effect of varying capacity at the different work processing areas in order to maximize the efficiency of the fictitious business. Also, in contrast to The Beer Game, the subject game invention allows one or more players to assume the role of a manager who, as in real life, will oversee the total business, oversee the different processing areas and establish a team strategy and depending on the style of the individual managing, either suggest or direct the different players of the processing areas to follow that strategy. Because the Beer Game does not permit collaboration, it is not practical to incorporate a manager role for one of the players.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 is a first example of a score card presenting the value equation for determining the net profit of a fictitious service-based business;

FIG. 7 is a second example of a score card presenting the value equation for determining the net profit of a fictitious mortgage origination business;

FIG. 8 is a third example of a score card presenting the value equation for determining the net profit of a fictitious corporate recruiting and attention/retention division of a business.

DETAILED DESCRIPTION OF THE INVENTION

Figure 1:
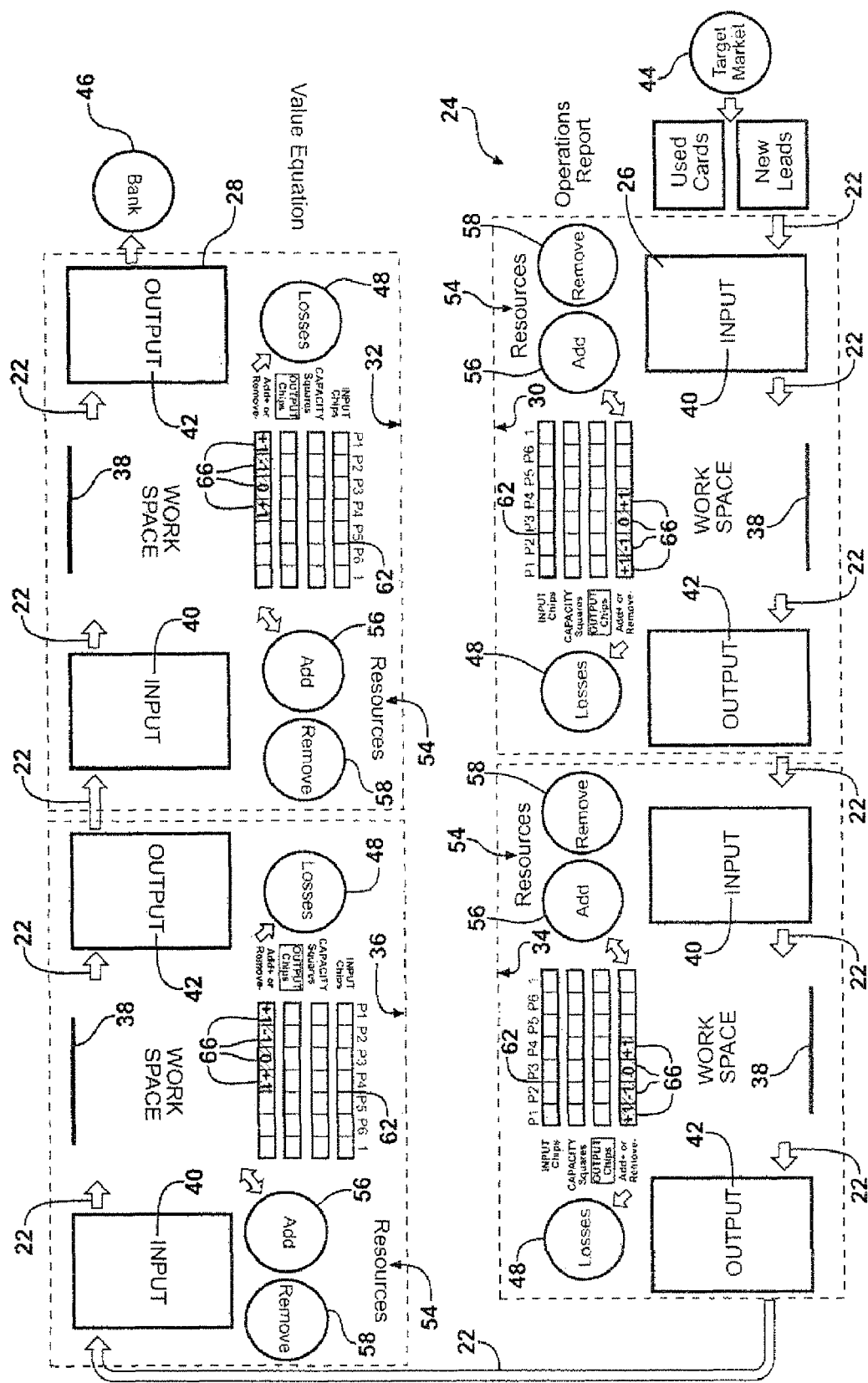
FIG. 1 is the playing surface of the exemplary embodiment.

Referring to the Figures, wherein like numerals indicate corresponding parts throughout the several views, the invention includes a game and a method for playing the game that teaches principles of dynamic business management by advancing tokens 20 along a work flow path 22 on a playing surface 24 or projected viewing area to simulate multiple concurrent processes of a fictitious business enterprise over time. The processes are described as concurrent in that they preferably run at the same time. A process engineer, however, may prefer to describe the processes as sequential because they lead from one to the next as distinguished from processes running in parallel where work forks out to two or more processes that run side by side based on a funneling of some work to one process and some to another. Each token 20 represents a unit of economic activity, which could be physical items, service items, information activities or any other form of activity that can be undertaken in a work process. The physical items could for example be goods, services, raw materials or finished goods. The service items could for example be inquiries, commitments, contracts or services delivered. Information activities could for example be idea generation, concept formulation or representation or the like.

In the exemplary embodiment, the tokens 20 are chips 20, as shown in FIGS. 2-5, however, the tokens 20 can take any convenient form. If played in an electronic game environment, the tokens 20 could be simple graphical projections on a viewing screen or in space. In the exemplary embodiment, all of the tokens 20 are the essentially the same or indistinguishable one from another. However, in a contemplated variation, the game may be played with tokens 20 of different colors, sizes or types to represent different units of economic activity, e.g., different types of work, or different values. As one very simplistic example, if a particular business being modeled by the game manufactures two very different types of products, and each product has unique attributes, those products could be represented by different color tokens 20. Of course, many other variations utilizing distinguishable tokens 20 are possible, and further enable the subject game to be adapted to almost any business model for the purpose of teaching managers in that context how to collaboratively optimize capacity and efficiency components in a dynamic business setting closely paralleling their own real world experiences.

The work flow path 22 extends from a start end 26 to a finish end 28. Accordingly, the playing surface 24 is presented with its work flow path 22 extending from a start end 26 to a finish end 28, and the tokens 20 are individually advanced along the work flow path 22 from the start end 26 toward the finish end 28 during the play of the game. In the exemplary embodiment, the playing surface 24, generally shown in FIGS. 1-5, is a game board 24, but it could also be displayed on a computer monitor or a television.

A first processing area 30, generally indicated in FIGS. 1-5, is established on the playing surface 24 at the start end 26 of the work flow path 22. Similarly, a last processing area 32, generally indicated in FIGS. 1-5, is positioned at the finish end 28 of the work flow path 22. At least one intermediate processing area 34, 36, generally shown in FIGS. 1-5, is positioned along the work flow path 22 between the first and last processing areas 30, 32. In this manner, at least three discrete and progressive processing areas 30, 32, 34, 36 are provided along the work flow path 22. Each processing area 30, 32 represents a different value-added function of the fictitious business.

Preferably, but by no means necessarily, the game includes two successive, i.e., sequential, intermediate processing areas 34, 36. In this case, as shown in FIG. 1, four processing areas 30, 32, 34, 36, are provided. For avoidance of doubt, the game could be played with three or more processing areas 30, 32, 34, 36. As explained above, each of the processing areas 30, 32, 34, 36 represents a different value adding, or work-additive, function of the fictitious business, and those processing areas 30, 32, 34, 36 can be tailored to a specific audience. For example, the game could be tailored to simulate a real life remodeling services business. For such a remodeling business, first processing area 30 could be considered a phone room processing area 30 or a marketing office processing area 30 for receiving unqualified leads and for converting the unqualified leads to qualified leads. The simulated remodeling business could include two intermediate processing areas 34, 36. The first intermediate processing area 34 could be a sales processing area 34, and the second intermediate processing area 36 could be a production processing area 36, for example. In this context, the sales processing area 34 receives the qualified leads from the phone room processing area 30 and converts the qualified leads to sold jobs. The production processing area 36 receives the sold jobs from the sales processing area 34 and converts the sold jobs to produced jobs. The last processing area 32 of this exemplary, remodeling business could be equated to an accounting processing area 32 which receives the produced jobs from the production processing area 36 and converts them to paid jobs to be deposited in the bank. This is just one example of how the game can be tailored to simulate a variety of fictitious businesses. As the tokens 20 move along the work flow path 22 from one processing area 30, 32 to the next, a further progression or transformation of the representative unit of economic activity or value is simulated. In this way, tokens 20 are placed on the start end 26 in a "raw" or "unfinished" condition and by passing through each processing area 30, 32, 34, 36, the tokens 20 are progressively formed into finished articles, services or other work product depending on the type of business being simulated. In other words, as the tokens move along the work flow path 22, the nature and value of the unit of economic activity changes. In the above example of a game simulating a remodeling services business, the tokens 20 progressively increase in value as they change from unqualified leads to qualified leads to sold jobs to produced jobs to paid jobs and finally to cash in the bank.

The game could also simulate a real-life mortgage origination business. For simulating a mortgage origination business, the first processing area 30 could be considered a lead generation processing area 30 for outputting leads. The simulated mortgage origination business could include two intermediate processing areas 34, 36. The first intermediate processing area 34 could be a loan origination processing area 34 for receiving the unqualified leads from the lead generation processing area 30 and for converting the unqualified leads into approved applications. The second intermediate processing area 36 could be a closing processing area 36 for receiving the approved applications from the loan origination processing area 34 and for converting the approved applications into funded loans. The last processing area 32 of this exemplary, mortgage origination business could be an accounting processing area 32 for receiving the funded loans from the loan origination processing area 34 and for converting the funded loans to collected fees. For such a mortgage origination business, the value of the tokens 20 changes as they become unqualified leads, approved applications, funded loans, collected fees and finally assets and liabilities after they leave the work flow path 22.

The game could also simulate a real-life corporate recruiting and attrition/retention work flow of a fictitious business. For such a recruiting work flow of the fictitious business, the first processing area 30 could be considered a search processing area 30 for receiving candidates and for outputting qualified candidates. The recruiting division of the fictitious business could include two intermediate processing areas 34, 36. The first intermediate processing area 34 could be a hire processing area 34 for receiving the qualified candidates from the search processing area 30 and for converting the qualified candidates into recruits on the staff of the business. The second intermediate processing area 36 could be an introduction processing area 36 for receiving the recruits on the staff of the business from the hire processing area 34 and for converting the recruits on the staff of the business into inducted employees. The last processing area 32 of this exemplary, fictitious corporate recruiting and attrition/retention division of a business could be a career management processing area 32 for receiving the inducted employees from the induction processing area 36 and for converting the inducted employees into retained employees. For a simulated recruiting work flow, the value of the tokens 20 changes as they become candidates, qualified candidates, recruits, inducted employees, retained employees and finally value per employee delivered to the fictitious business.

The game may also be structured to include one or more parallel processes in addition to the sequential processes represented by processing areas 30, 32, 34, 36. In order to better simulate a particular real world business example, or perhaps to use the subject game as a modeling tool for use in considering what possible changes could have on a business enterprise, different colored tokens 20 (e.g., green for one type of customer and red for another) might be introduced at the start end 26 of the work flow path 22. The pattern at which the different colored tokens 20 are introduced at the start end 26 can either be random or it can be a structured sequence. In other words, in order to simulate a particular business model, the game designer/facilitator may arrange for tokens 20 of one color to enter the work flow path 22 at a predictable rate of say 2:1 as compared with tokens 20 of another color. Alternatively, the tokens 20 of one color may unpredictably enter the work flow path 22 relative to tokens 20 of another color. All of the tokens 20 could flow through one or more common processes before channeling to special parallel processing areas (e.g., the green tokens 20 only flow into one of the processing areas and the red tokens 20 only flow into separate, parallel processing area). Accordingly, by making slight variations to the game method and apparatus, a fictitious environment can be adapted to closely parallel any almost type of business operation in the real world. Players may then engage in interactive learning processes in which they come to appreciate how to collaborate with colleagues and collectively optimize capacity and efficiency components in a dynamic business setting that approximates their own real world context.

To better simulate real-world conditions, a constraint zone 38 is established in each processing area 30, 32. All tokens 20 must pass through each constraint zone 38 while advancing toward the finish end 28 of the work flow path 22 during the play of the game. Each constraint zone 38 has a specified token 20 capacity for limiting the number of tokens 20 therein at any one time. Said another way, at least one constraint zone 38 is created within each processing area 30, 32 through which tokens 20 must pass while advancing toward the finish end 28 during play of the game. Each constraint zone 38 has a specified token 20 capacity so that the number of tokens 20 that can reside therein at any one time is limited by its token 20 capacity. As shown in FIGS. 1-5, each of the constraint zones 38 of the exemplary embodiment is identified as a work space zone 38. However, the constraint zones 38 can be located in other regions of the various processing areas 30, 32, 34, 36 if desired to better model a particular kind of real-world business.

An input zone 40 is defined within each processing area 30, 32, 34, 36 and disposed along the work flow path 22. Preferably, the input zones 40 are placed immediately upstream of the constraint zone 38 of the associated processing area 30, 32, 34, 36. The tokens 20 must pass through the input zones 40 while advancing along the work flow path 22. In the exemplary embodiment, each of the input zones 40 is assigned an unlimited token 20 capacity. In other words, the number of tokens 20 that can reside in each of the input zones 40 at any one time is unconstrained, however, constraints can be imposed if desired.

An output zone 42 is defined within each processing area 30, 32 and disposed along the work flow path 22. In the preferred embodiment, the output zones 42 are located immediately downstream of the constraint zone 38 of the associated processing area 30, 32, 34, 36. The tokens 20 must pass through the output zones 42 while advancing along the work flow path 22. In the exemplary embodiment, each of the output zones 42 is assigned an unlimited token 20 capacity. In other words, the number of tokens 20 that can reside in each of the output zones 42 at any one time is unconstrained, however, constraints could be imposed if desired.

The playing surface 24 of the exemplary embodiment presents a stripe, or plurality of arrows, to represent the work flow path 22, with the start end 26 being at the input zone 40 of the first processing area 30 and the finish end 28 being at the output zone 42 of the last processing area 32. In the exemplary embodiment, the playing surface 24 includes a target market zone 44 including a plurality of tokens 20 for placement in the of the work flow path 22. The target market zone 44 serves as a reservoir of tokens 20 awaiting placement at the start end 26 of the work flow path 22. A bank zone 46 is located on the playing surface 24 adjacent the finish end 28 of the work flow path 22. The bank zone 46 represents a completed or finished token 20 which has successfully traveled along the work flow path 22 and exited the finish end 28. In an analogy to real-world business activity, the bank zone 46 could represent money or other value that has been deposited for safe-keeping. Each of the processing areas 30, 32, 34, 36 of the exemplary embodiment further presents a losses zone 48, which will be described in more detail below.

At least one work square 50, 52 is formed in the constraint zones 38 to represent its token 20 capacity. The work squares 50, 52 can either be "good" 50 or "bad" 52, meaning they are either productive or unproductive. During the play of the game, no more than a predetermined number of tokens 20 may reside on each of the work squares 50, 52 at one time. In the exemplary embodiment, the predetermined number of tokens 20 that may reside on each work square 50, 52 is only one. As best shown in FIGS. 2-5, white stamps 50 represent the good work squares 50 and grey stamps 52 represent the bad work squares 52 in the exemplary embodiment, however they could be distinguished by other techniques. The use of the good and bad work squares 50, 52 will be described in further detail below. The exemplary embodiment is described with only two different types of work squares 50, 52, but the game may be played with any number of different types of work squares 50, 52. For example, where three or more different types of work squares are used, the additional work squares may represent a special quality of work capacity able to work on tokens of a particular color/size/type, different capacity costs or different yield losses. In other words, the work squares 50, 52, could be in two or more colors/types to differentiate different qualities. If the minimum of two are used, as described in connection with the exemplary embodiment, then the difference is preferably between 'good' capacity and 'bad' capacity where a token 20 landing on 'bad' capacity becomes a loss.

As best shown in FIG. 1, each processing area 30, 32, 34, 36 includes a resources region 54. The resources regions 54 each include an add zone 56 and a remove zone 58. As shown in FIGS. 2-5, a stamp dispenser 60 is disposed on each of the add zones 56 for dispensing the good and bad work squares 50, 52. The stamp dispenser 60 of the exemplary embodiment includes the white and grey stamps 50, 52 arranged on a carrier strip and coiled in the stamp dispenser 60. Of course, the use of a stamp dispenser 60 is expedient for physical/tangible game boards, and can be substituted for other devices that provide similar functionality in either physical or electronic playing mediums. The arrangement of the good and bad work squares 50, 52 in the stamp dispenser 60 can either be predetermined or it can be random. In other words, the work squares 50, 52 can be loaded in a predetermined good-bad sequence by the game designer, or merely randomly distributed so that a percentage are bad work squares 52 and the remainder are good work squares 50.

As best shown in FIG. 1, each processing area 30, 32, 34, 36 of the exemplary embodiment includes a recording sheet 62 for recording the number of tokens 20 residing in the associated input and output zones 40, 42, for recording the number of work squares 50, 52 in the associated work space zone 38 and for recording a change in capacity, which will be described in further detail below.

Figure 2:
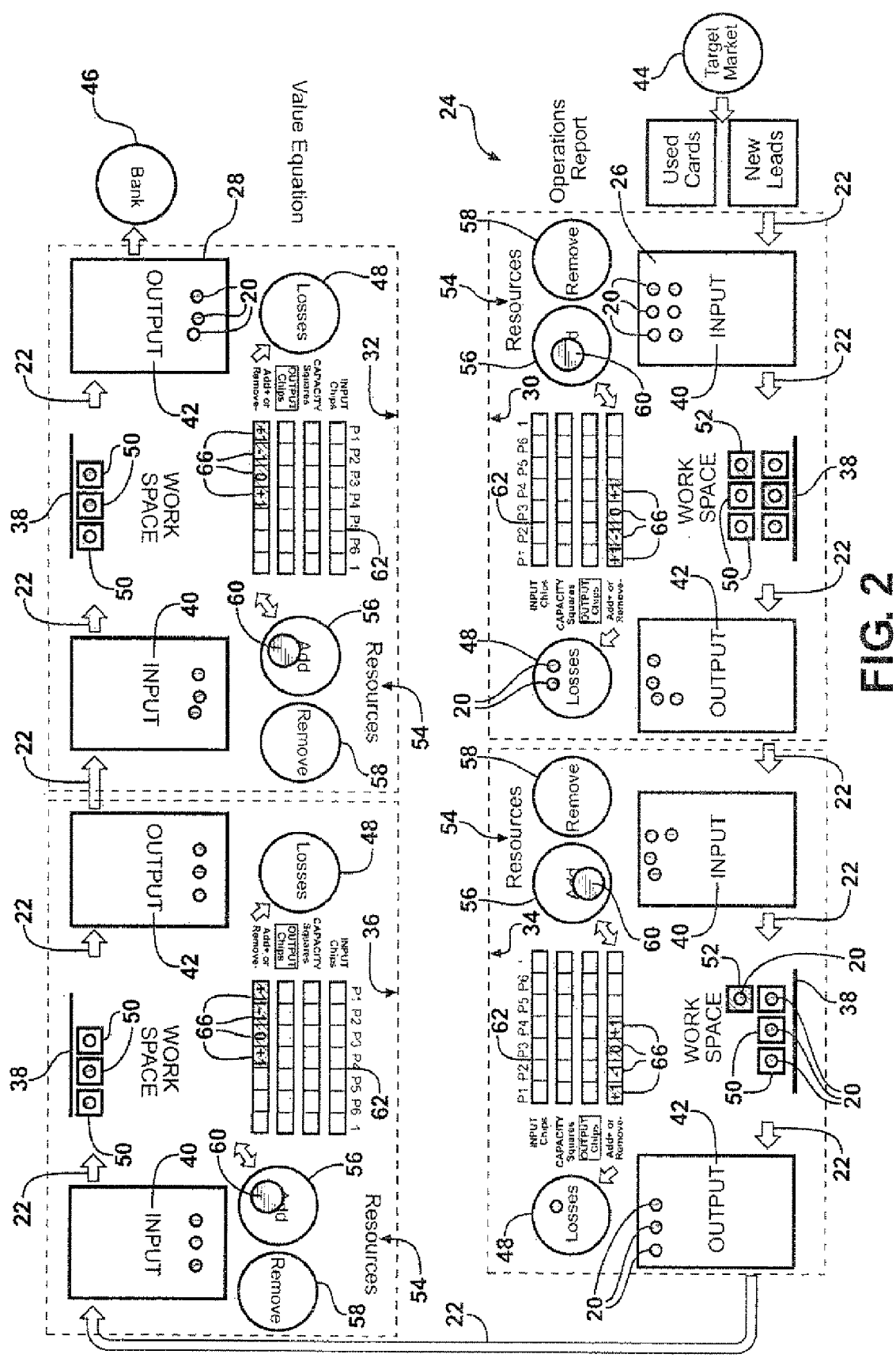
FIG. 2 is the playing surface of the exemplary embodiment and having a pre-loaded number of tokens arranged through the different zones of each processing area of the exemplary embodiment.

To further facilitate game play, it may be desirable to pre-load a predetermined number of tokens 20 on the input zones 40 and the constraint and the output zones 38, 42 of each of the processing areas 30, 32, 34, 36 before the start of game play. One example of such a pre-loaded playing surface 24 is shown in FIG. 2. However, it will be appreciated that the specific number of tokens 20 placed in the various zones 38, 40, 42, 44, 46, 48, 56, 58 along the work flow path 22 can be varied to suit the context of the game.

Figure 3:
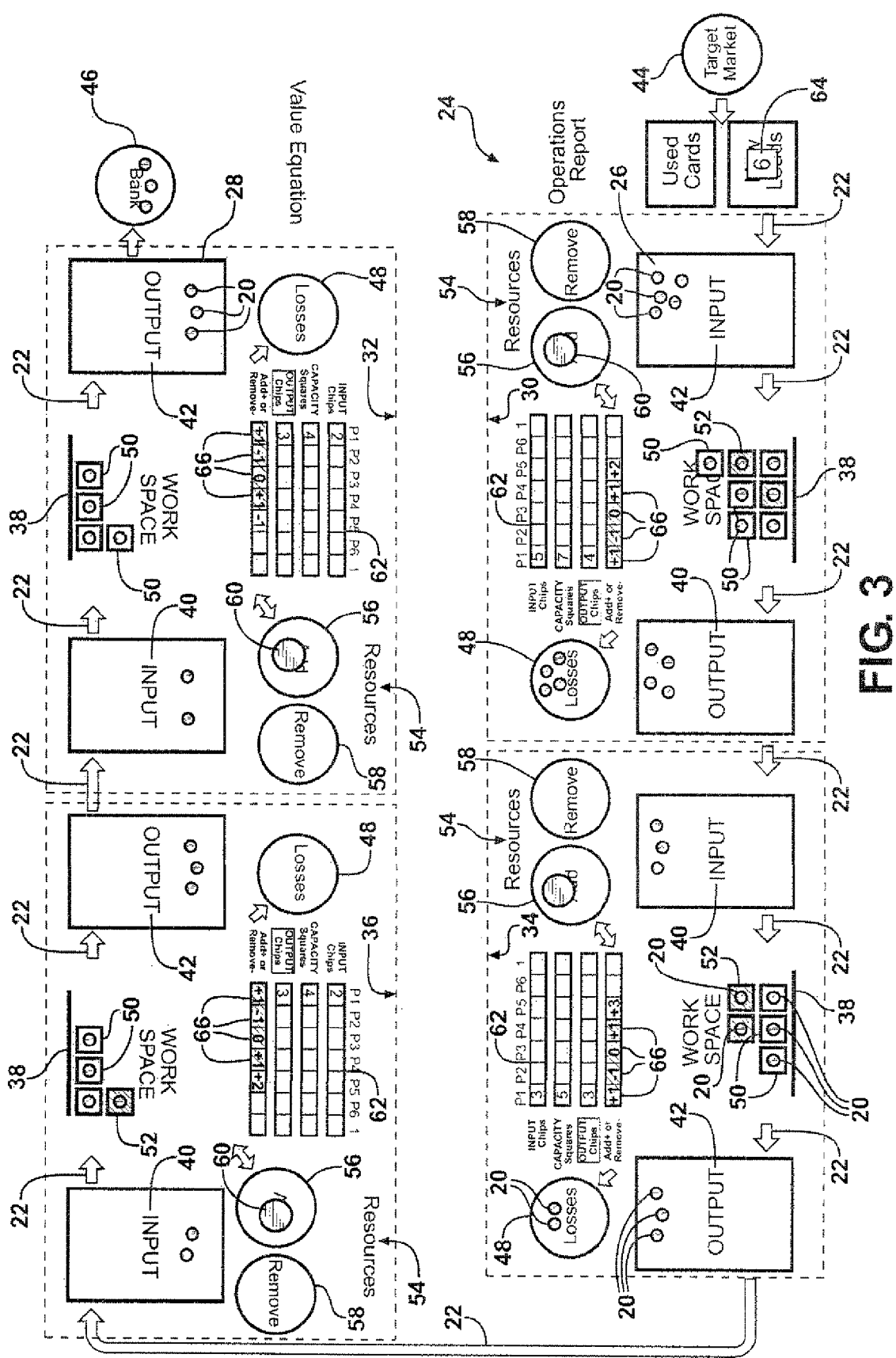
FIG. 3 is the playing surface of the exemplary embodiment after playing a first round.
Figure 4:
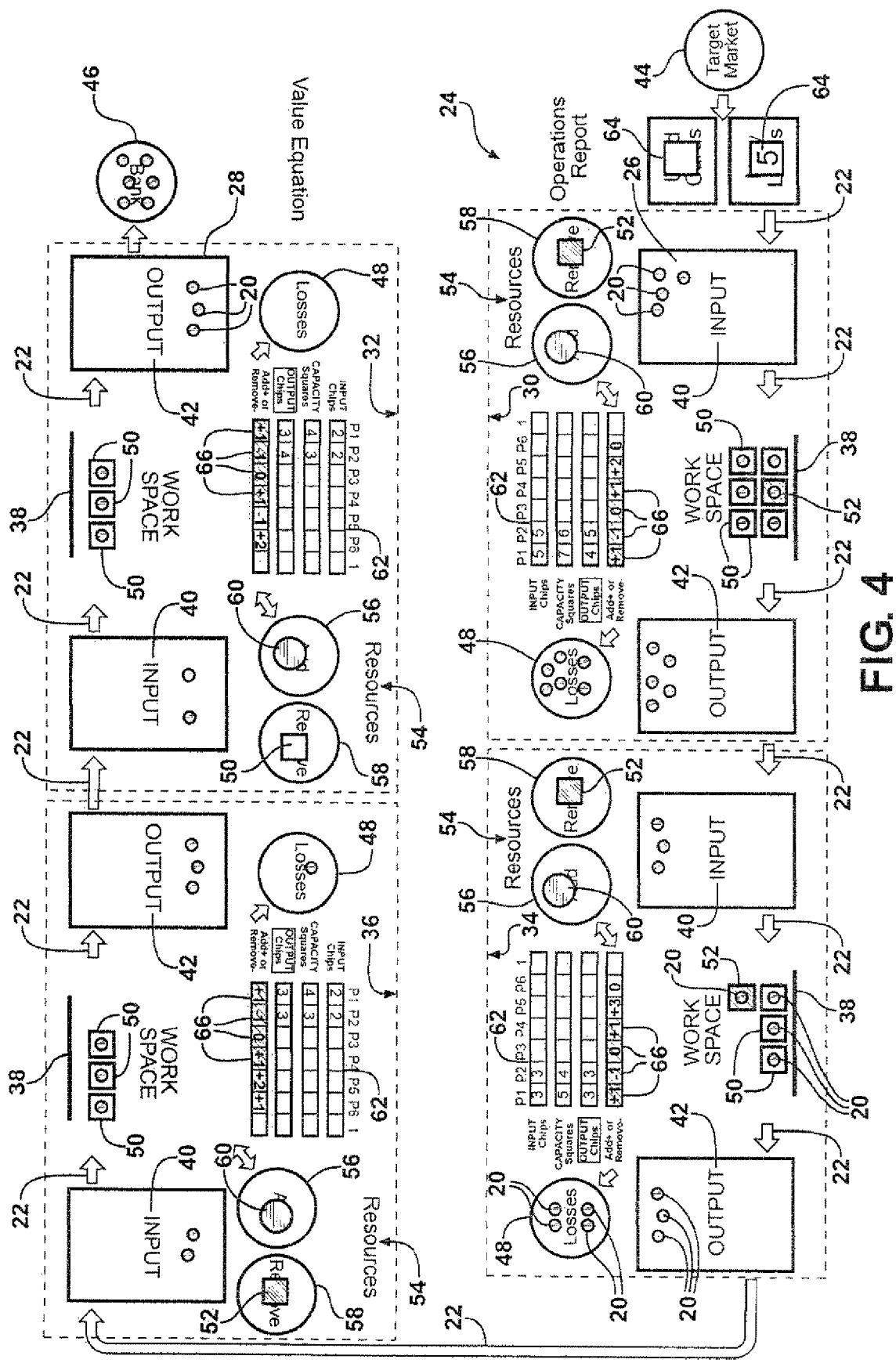
FIG. 4 is the playing surface of the exemplary embodiment after playing a second round.
Figure 5:
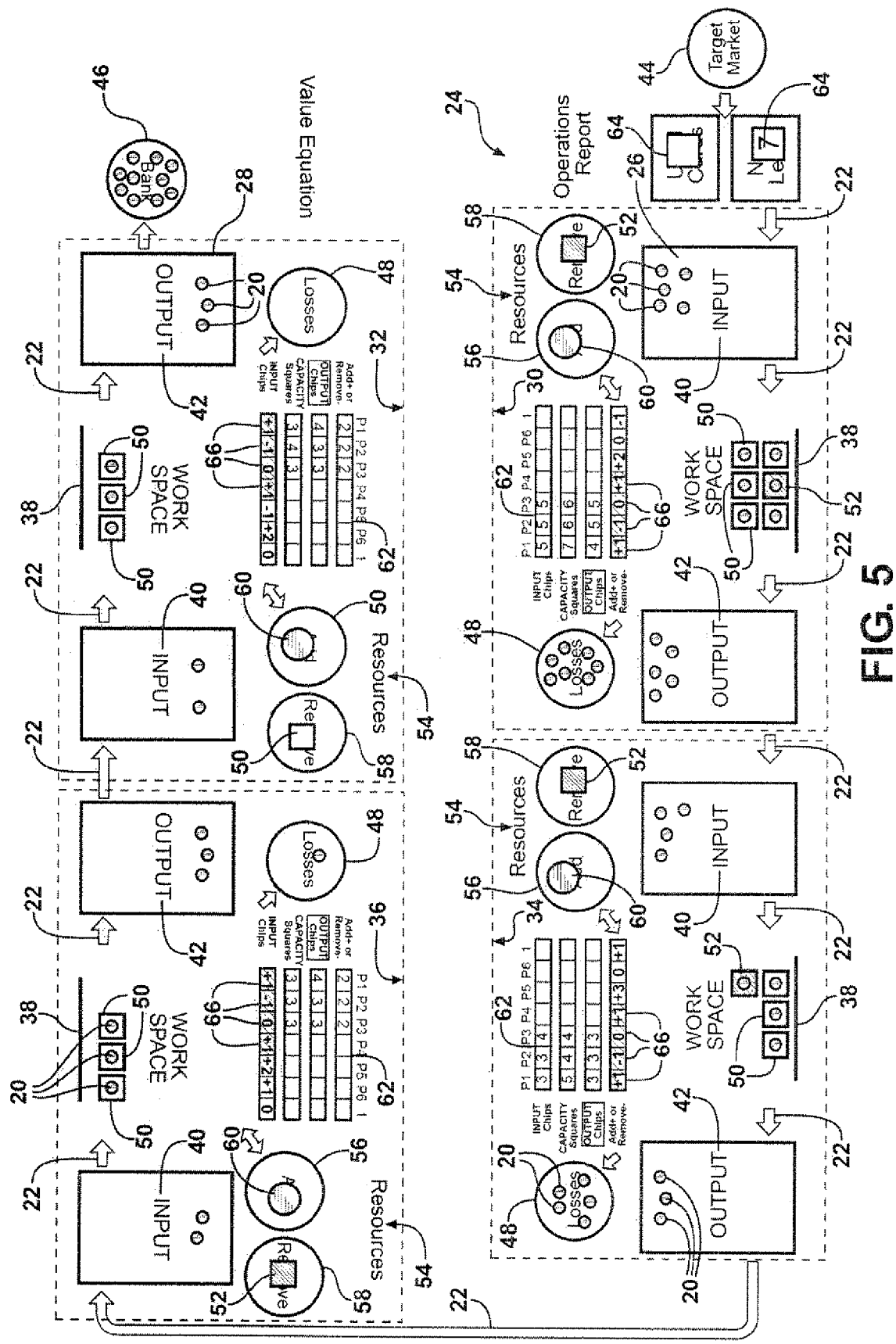
FIG. 5 is the playing surface of the exemplary embodiment after playing a third round.
Figure 9:
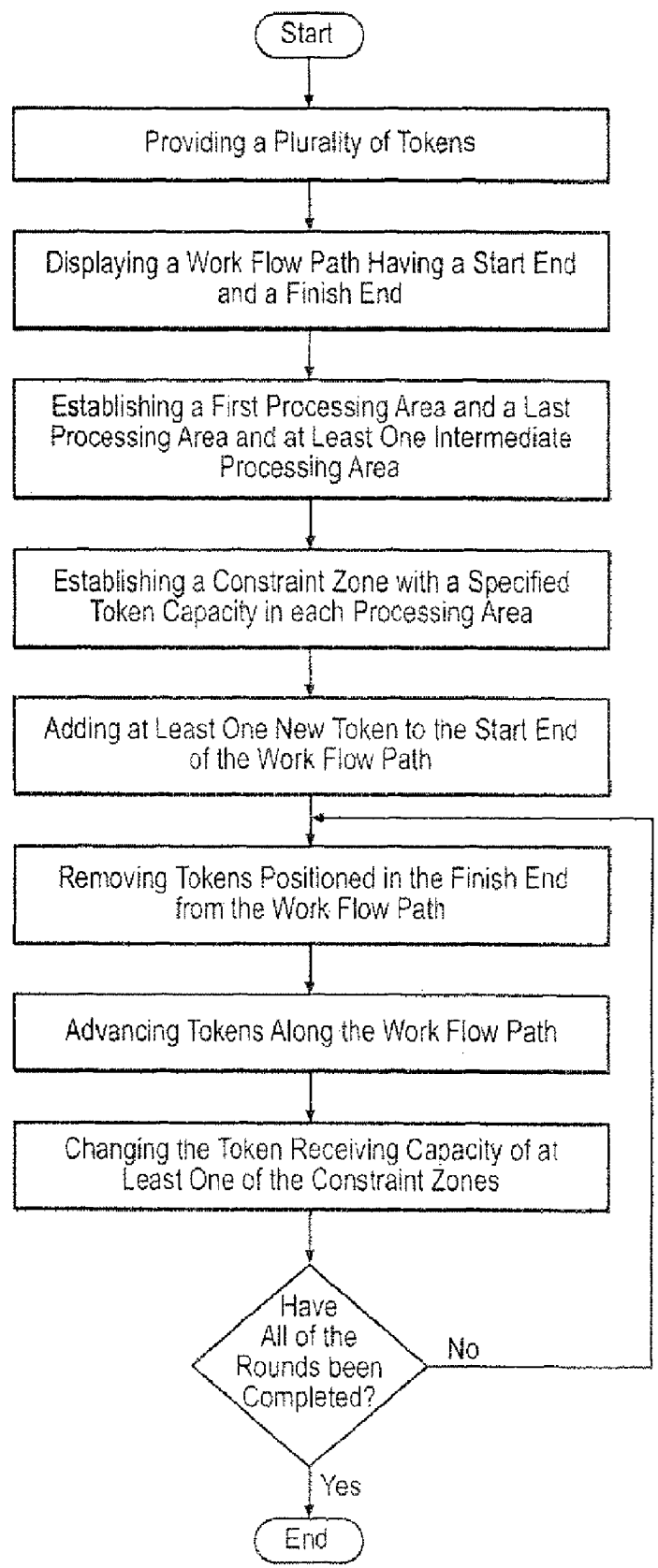
FIG. 9 is a flow chart describing the basic method steps of the invention.

The game method is played in rounds. A plurality of rounds, e.g. 10 or 20, will simulate the operation of the fictitious business over time. See FIGS. 2-5 for an example of how the rounds of the exemplary embodiment are played. FIG. 2 shows the playing surface 24 being pre-loaded with tokens 20 on each of the processing areas 30, 32, 34, 36. FIG. 3 shows the playing surface 24 and the tokens 20 after the completion of the first round. FIG. 4 shows the playing surface 24 after the completion of the second round. Finally, FIG. 5 shows the playing surface 24 after the completion of the third round.

Each round includes the step of adding at least one new token 20 to the start end 26 of the work flow path 22 in the first processing area 30. In the exemplary embodiment, the number of tokens 20 to be added to the start end 26 of the work flow path 22, or the input zone 40 of the first processing area 30, is determined using a deck of cards 64. Instead of the cards 64, some other technique could be used to command the number of tokens 20 added to the work flow path 22 during each round. In the first example round, shown in FIG. 3, the number "6" is displayed on a card 64 adjacent the input zone 40 of the first processing area 30, and six tokens 20 were added to the input zone 40 of the first processing area 30. The number of tokens 20 to be added to the start end 26 of the work flow path 22 during each turn can either be pre-determined or random. When the number is pre-determined, the game can be tailored to simulate a seasonal business by having the number of tokens 20 added to the start end 26 of the work flow path 22 increase from the early rounds to the middle rounds and then shrink from the middle rounds to the later rounds. Market volatility can also be simulated in the game by varying in each round the number of tokens 20 to be added to the start end 26 of the work flow path 22.

Each round continues with the step of removing tokens 20 positioned at the finish end 28 from the work flow path 22. In the example rounds, the tokens 20 that were residing on the output zone 42 of the last processing area 32 in the pre-loaded board of FIG. 2, have been moved to the bank zone 46 during the first round, as shown in FIG. 3.

Within each processing area 30, 32, 34, 36, the tokens 20 in the input zone 40 are moved to the work squares 50, 52 in the constraint zone 38. If there are more tokens 20 in the input zone 40 than there are available work squares 50, 52, then some of the tokens 20 must remain in the input zone 40. All tokens 20 which were on the good work squares 50 at the start of the round are moved to the output zone 42, and all tokens 20 in the output zone 42 are advanced to the input zone 40 of the next processing area 30, 32, 34, 36. Tokens 20 residing on the bad work squares 52 are moved out of the work flow path 22 to the associated losses zone 48. This represents yield losses occurring at the different functions of the fictitious business. In the example rounds, the tokens 20 that were residing on the bad work squares 52 in the first and second processing areas 30, 34 of the pre-loaded board of FIG. 2 have been moved to their respective losses zones 48 during the first round, as shown in FIG. 3.

In this manner, each round continues by advancing tokens 20 along the work flow path 22 to the next sequential constraint zone 38 or processing area 30, 32, 34, 36 subject to any token 20 capacity constraints. As shown in the example rounds, the tokens 20 that were residing on the output zones 42 of the first, second, and third processing areas 30, 34, 36 on the pre-loaded playing surface 24 of FIG. 2 have been moved along the work flow path 22 to the input zone 40 of the next respective processing area 30, 32 in the first round, as shown in FIG. 3. The tokens 20 that were residing on the good work squares 50 on the pre-loaded playing surface 24 of FIG. 2 have been moved along the work flow path 22 to the output zone 42 of the associated processing area 30, 32, 34, 36 in the first round, as shown in FIG. 3. The tokens 20 that were residing in the input zones 40 on the pre-loaded playing surface 24 of FIG. 2 have been moved along the work flow path 22 and distributed across the work squares 50, 52 of the constraint zone 38 subject to the capacity of the work squares 50, 52 in the first round, as shown in FIG. 3.

The token 20 capacity of at least one of the constraint zones 38 is changed during at least one round to provoke variations in the rate of token 20 advance along the work flow path 22. Changing the token 20 capacity in this manner simulates a management decision. Decisions of this type imposed on a dynamic system (i.e., multiple processing areas 30, 32, 34, 36) over time will create observable effects. For example, the rate of token 20 advance along the work flow path 22 may or may not be visually affected by changing the token 20 capacity in any one or more constraint zones 38. By observing the effects of these changes, players begin to learn how the dynamic system reacts to changes. From this, decisions can be made (i.e. capacity changes) that optimize the system and promote more rapid movement of tokens 20 to the finish end 28 of the work flow path 22. In the exemplary embodiment, the capacity change is represented by adding or removing work squares 50, 52 from the work space zone 38 of any one of the processing areas 30, 32, 34, 36.

Capacity is added to a processing area 30, 32 by moving stamps 50, 52 (i.e. work squares 50, 52) from the stamp dispenser 60 in the add zone 56 of the resources region 54 to the constraint zone 38 of the associated processing area 30, 32, 34, 36. As shown in the example rounds, work squares 50, 52, have been added to the work space zone 38 in each of the processing areas 30, 32, 34, 36 to simulate an increase in capacity at each processing area 30, 32 from the pre-loaded board shown in FIG. 2 to the end of the first round shown in FIG. 3.

Capacity is reduced from the processing area 30, 32, 34, 36 by moving stamps 50, 52 from the constraint zone 38 to the remove zone 58 of the resources region 54 of the associated processing area 30, 32, 34, 36. As shown in the example rounds, work squares 50, 52, have been moved from the constraint zones 38 of each of the processing areas 30, 32, 34, 36 to simulate a decrease in capacity at each processing area 30, 32, 34, 36 from the end of the first round shown in FIG. 3 to the end of the second round shown in FIG. 4.

The game may be played with a predetermined number of practice rounds. During those practice rounds, the capacity change for each of the processing areas 30, 32, 34, 36 is predetermined. The predetermined capacity change 66 of the exemplary embodiment is shown on the recording sheets 62 of FIG. 2. These practice rounds give the players a chance to understand the flow of the game before making management decisions, i.e. changing the capacity of the constraint zones 38.

Preferably, but by no means necessarily, each round further includes the step of determining a capacity change for each of the constraint zones 38 to take place after a predetermined number of rounds. The capacity change is preferably recorded on the recording sheets 62 of the processing areas 30, 32, 34, 36. The delay between determining the capacity change and the actual changing of the capacity simulates a lag in changing capacity in the fictitious business. In the exemplary embodiment, the number of rounds between determining a capacity change and changing the capacity is four rounds. As shown in FIG. 3, the capacity change for the fifth round has been determined in the first round and is recorded on each of the recording sheets 62.

For score keeping purposes, each of the rounds includes the step of recording the number of tokens 20 residing on each of the input and output zones 40, 42 and the number of work squares 50, 52 in each of the constraint zones 38. In the exemplary embodiment, each of these values is recorded on the recording sheets 62, but they may alternately be recorded using an electronic means.

After the predetermined number of rounds is complete, the score of the team is calculated according to a value equation 68. The value equation 68 includes a gross value created by the work flow and a gross costs of the work flow. A net value created is determined. In the exemplary embodiment, the gross value created is the cash received in the bank region, and the net value created is the net profit after deducting the costs for the work flow. The gross value created is based at least on the number of tokens 20 residing in the bank zone 46 of the playing surface 24, or on the number of tokens 20 that have passed through one of the processing areas 30, 32, 34, 36 of the work flow path 22 during the playing of the game. The gross costs is dependent on the value model adopted. Preferably, but by no means necessarily, gross costs are based on the token 20 capacity of at least one of the constraint zones 38 during the rounds of the game and the number of tokens 20 that have passed through the output zone 42 of at least one of processing areas 30, 32, 34, 36 during the playing of the game. Fixed expenses may also be factored into the gross costs. An exemplary value equation 68 for a game simulating remodeling services business is shown in FIG. 6. The gross value created for such a remodeling business could be proportional to the number of tokens 20 that passed through the output zone 42 of the accounting processing area 32. The gross expenses for the remodeling business could include production costs, marketing costs, sales costs, production management costs, and accounting costs. The production expenses of the embodiment shown in FIG. 6 are proportional to the number of tokens 20 that passed through the output zone 42 of the production processing area 36 during the playing of the game. The marketing costs are fixed and determined by the game facilitator. The sales costs are proportional to the number of tokens 20 that passed through the output zone 42 of the sales processing area 34. The production management costs are proportional to the total number of work squares 50, 52 in the production processing area 36 during the playing of the game. The accounting costs are proportional to the total number of work squares 50, 52 in the accounting processing area 32 during the playing of the game.

A second exemplary value equation 68 is shown in FIG. 7 for a game simulating a mortgage origination business. The gross value created for the simulated mortgage origination business includes the value of the assets of loans funded as well as the fees collected. The fees collected from loans is proportional to the total number of tokens 20 that passed through the input zone 40 of the closing processing area 36, and the assets from the loans created is proportional to the total number of tokens 20 that passed through the output zone 42 of the closing processing area 36. The gross costs for such a mortgage origination business could include lead generation costs, loan origination costs, closing costs, accounting costs, and CDO/Bundled loans liabilities. The lead generation costs is proportional to the total number of work squares 50, 52 in the lead generation processing zone 30 during the playing of the game. The loan origination costs is proportional to the total number of work squares 50, 52 in the loan origination processing zone 34 during the playing of the game. The closing costs is proportional to the total number of tokens 20 that passed through the output zone 42 of the closing processing area 36 during the playing of the game. The accounting costs is proportional to the total number of work squares 50, 52 in the accounting processing area 32 during the playing of the game. Finally, the CDO/Bundled loans liabilities is proportional to the total number of tokens 20 that passed through the output zone 42 of the closing processing area 36 during the playing of the game.

The game can also be used to simulate a division of a business. A third exemplary value equation 68 is shown in FIG. 8 for a game representing a fictitious corporate recruiting and attrition/retention division of a business. This embodiment simulates the value created and costs incurred during the process of recruiting, training and retaining new employees. The gross value created for such a fictitious business work flow is expressed as the value to the business expected per employee and is proportional to the total number of tokens 20 that passed through the output zone 42 of the introduction processing area 36 during the playing of the game. The gross costs for such a corporate recruiting and attrition/retention workflow include search costs; recruit and hire costs; induction costs; career management costs; and attrition costs. The search costs is proportional to the total number of work squares 50, 52 in the search processing area 30 during the playing of the game. The recruit and hire costs is proportional to the total number of work squares 50, 52 in the hiring processing area 34 during the playing of the game. The induction costs is proportional to the total number of work squares 50, 52 in the induction processing area 36 during the playing of the game. The career management costs is proportional to the total number of work squares 50, 52 in the career management processing area 32 during the play of the game. The attrition costs is proportional to the total number of tokens 20 residing in the losses zone 48 of the induction processing area 36. It should be appreciated that the value equation 68 can take many forms and is not limited to those embodiments shown in FIGS. 6, 7 and 8.

The game is preferably played by a team with at least one person in charge of each of the processing areas 30, 32, 34, 36. As can be seen in FIGS. 2-5, the processing areas 30, 32, 34, 36 are arranged in a U-shape with the first and last processing areas 30, 32 opposing each other and the two intermediate processing areas 30, 32, 34, 36 opposing each other. This layout provides maximum communication among the different players of the game. The team may communicate to develop a strategy that maximizes the efficiency of their fictitious business. Preferably, each team may also include a supervisor who works with the other players to come up with the strategy and is then responsible for making sure that each player follows that strategy. The processing areas 30, 32, 34, 36 may be arranged in a variety of different layouts layouts, e.g. a circle or a line. The different layouts of the processing areas 30, 32, 34, 36 may adversely affect the amount of communication between the different processing areas 30, 32, 34, 36 and the team may end up with different results due to their inhibited communication. For example, where the processing areas 30, 32, 34, 36 are arranged in a line, communication between the first and last processing areas 30, 32 is difficult, and if the team has a supervisor, that supervisor has even more responsibility to make sure that the players at the different processing areas 30, 32, 34, 36 are following the team's strategy.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A method for playing a game that teaches principles of dynamic business management by advancing tokens along a work flow path to simulate multiple processes of a fictitious business enterprise over time, comprising the steps of:
    providing a plurality of tokens each representing an imaginary unit of economic activity;
    displaying a work flow path for advancement of the tokens from a start end to a finish end during the play of the game;
    establishing a first processing area positioned at the start end of the work flow path and a last processing area positioned at the finish end of the work flow path and at least one intermediate processing area positioned along the work flow path between the first and last processing areas;
    establishing a constraint zone with a specified token capacity in each processing area through which all tokens must pass while advancing toward the finish end of the work flow path during the play of the game for limiting the number of tokens therein at any one time;
    playing a plurality of rounds with each round comprising the steps of;
    adding at least one new token to the start end of the work flow path in the first processing area,
    removing tokens positioned at the finish end from the work flow path,
    advancing tokens along the work flow path, and
    changing the token capacity of at least one of the constraint zones during a round to provoke variations in the rate of token advance along the work flow path to thereby simulate a management decision on a dynamic system over time so that its effects can be observed.

2. The method as set forth in claim 1 further including the step of defining an input zone within each processing area and disposed along the work flow path immediately upstream of the constraint zone of the associated processing area and through which tokens must pass during said step of advancing tokens along the work flow path.

3. The method as set forth in claim 1 further including the step of defining an output zone within each processing area and disposed along the work flow path immediately downstream of the constraint zone of the associated processing area and through which tokens must pass during said step of advancing tokens along the work flow path.

4. The method as set forth in claim 1 wherein each of the rounds further includes the step of determining a capacity change for at least one of the processing areas to take place after a predetermined number of rounds to simulate a lag in the ability to change capacity at any of the processing areas.

5. The method as set forth in claim 1 further including the step of determining a net value created using a value equation based at least on the number of tokens that have reached a predetermined point in the work flow path to simulate value being added to the imaginary units of economic activity represented by the tokens.

6. The method as set forth in claim 5 wherein the step of determining a net value created using the value equation is further based on the token capacity of the processing areas during the plurality of turns.

7. The method as set forth in claim 5 wherein the step of determining a net value created using the value equation is further based on the number of tokens that have passed through at least one of the processing areas during said step of playing the plurality of rounds.

8. The method as set forth in claim 1 further including the step of presenting at least one work square in at least one of the constraint zones wherein no more than a predetermined number of tokens may reside on each of the work squares at any time to represent the token capacity of the associated constraint zone.

9. The method as set forth in claim 8 wherein the step of presenting at least one work square is further defined as presenting at least one good work square in at least one of the constraint zones to represent capacity to do work and presenting at least one bad work square in at least one of the constraint zones to represent unproductive capacity.

10. The method as set forth in claim 9 wherein the playing of each round further includes the step of removing all tokens residing on the bad work squares out of the work flow path to simulate yield losses resulting from the unproductive capacity of the fictitious business.

11. The method as set forth in claim 8 wherein the step of changing the capacity is further defined changing the number of work squares in the constraint zone of the associated processing area.

12. A method for playing a game that teaches principles of dynamic business management by advancing tokens along a work flow path to simulate multiple processes of a fictitious business enterprise over time, comprising the steps of:
 providing a plurality of tokens, each token representing an imaginary unit of economic activity;
 presenting a playing surface having a work flow path extending from a start end to a finish end, the tokens being individually advanced along the work flow path from the start end toward the finish end during play of the game;
 establishing at least three discrete and progressive processing areas along the work flow path representing different functions of the fictitious business, the at least three processing areas including a first processing area positioned at the start end, a last processing area positioned at the finish end, and at least one intermediate processing area positioned between the first and last processing areas;
 defining at least one constraint zone within each processing area through which tokens must pass while advancing toward the finish end during play of the game, each constraint zone having a specified token capacity wherein the number of tokens that can reside therein at any one time is limited by its token capacity;
 playing a plurality of rounds, each round comprising the steps of:
 adding at least one new token to the start end of the work flow path in the first processing area subject to any token capacity constraint; and
 removing tokens positioned at the finish end from the work flow path;
 advancing tokens along the work flow path to the next sequential constraint zone or processing area subject to any token capacity constraints; and
 changing the token capacity of at least one of the constraint zones during said playing step to provoke variations in the rate of token advance along the work flow path, whereby said changing step simulates a management decision on a dynamic system over time so that its effects can be observed.

13. A game for teaching principles of dynamic business management by simulating multiple processes of a fictitious business enterprise over a plurality of rounds while playing the game, comprising;
 a plurality of tokens for representing an imaginary unit of economic activity for each token,
 a playing surface presenting a work flow path for advancement of said tokens from a start end to a finish end,
 said playing surface defining a first processing area positioned at the start end of said work flow path and a last processing area positioned at the finish end of the work flow path and at least one intermediate processing area positioned along the work flow path between the first and last processing areas,
 each of said processing areas including a constraint zone having a specified token capacity and through which all tokens must pass while advancing toward the finish end of the work flow path during the play of the game for limiting the number of tokens therein at any one time and said token capacity being changeable for provoking variations in the rate of token advance along said work flow path to thereby simulate a management decision on a dynamic system over time so that its effects can be observed.

14. The game as set forth in claim 13 wherein said playing surface presents an input zone within each processing area and disposed along said work flow path immediately upstream of said constraint zone of the associated processing area and through which tokens must pass while advancing along said work flow path.

15. The game as set forth in claim 13 wherein said playing surface presents an output zone within each processing area and disposed along said work flow path immediately downstream of said constraint zone of the associated processing area and through which tokens must pass while advancing along said work flow path.

16. The game as set forth in claim 13 wherein each of said constraint zones includes at least one work square to represent said token capacity and wherein no more than a predetermined number of tokens may reside on each of said work squares at any time.

17. The game as set forth in claim 16 further including at least one good work square to represent productive capacity and through which tokens advance along said work flow path and at least one bad work square to represent unproductive capacity for removing tokens from said work path to simulate yield losses in the fictitious business.

18. The game as set forth in claim 17 further including a dispenser containing a concealed plurality of said good work squares and said bad work squares for adding said work squares to at least one of said constraint zones to represent adding capacity to the associated processing area.

19. The game as set forth in claim 18 wherein said good and bad work squares are further defined as self-adhesive stamps.

20. The game as set forth in claim 19 wherein said self-adhesive strips are arranged on a carrier strip and coiled in said dispenser.

* * * * *